United States Patent
Ciccarelli

(10) Patent No.: US 7,672,009 B2
(45) Date of Patent: *Mar. 2, 2010

(54) SYSTEMS AND METHODS FOR PROVIDING TRUE SCALE MEASUREMENTS FOR DIGITIZED DRAWINGS

(75) Inventor: Victor Ciccarelli, Santee, CA (US)

(73) Assignee: Archaio, LLC, New York, NY (US)

( * ) Notice: Subject to any disclaimer, the term of this patent is extended or adjusted under 35 U.S.C. 154(b) by 1126 days.

This patent is subject to a terminal disclaimer.

(21) Appl. No.: 10/629,347

(22) Filed: Jul. 28, 2003

(65) Prior Publication Data

US 2004/0095588 A1 May 20, 2004

Related U.S. Application Data

(60) Provisional application No. 60/398,927, filed on Jul. 27, 2002.

(51) Int. Cl.
*G06K 15/00* (2006.01)
*G06K 9/00* (2006.01)

(52) U.S. Cl. .................. 358/1.18; 358/1.9; 382/113

(58) Field of Classification Search .............. 358/1.1, 358/1.9, 1.11–1.18; 382/113, 198, 276, 305
See application file for complete search history.

(56) References Cited

U.S. PATENT DOCUMENTS

| | | | |
|---|---|---|---|
| 4,193,087 A | | 3/1980 | Altman |
| 4,661,811 A | | 4/1987 | Gray et al. |
| 5,448,696 A | | 9/1995 | Shimada et al. |
| 6,134,338 A | * | 10/2000 | Solberg et al. .............. 382/113 |
| 6,321,158 B1 | | 11/2001 | DeLorme et al. |
| 6,529,137 B1 | | 3/2003 | Roe |
| 6,704,695 B1 | * | 3/2004 | Bula et al. .................... 703/6 |
| 6,941,000 B2 | | 9/2005 | Wong |
| 7,134,088 B2 | | 11/2006 | Larsen |
| 7,356,406 B2 | | 4/2008 | Harrison et al. |
| 2002/0077787 A1 | * | 6/2002 | Rappaport et al. .......... 702/188 |
| 2003/0125998 A1 | | 7/2003 | McKenney et al. |
| 2003/0234725 A1 | | 12/2003 | Lemelson et al. |
| 2003/0234731 A1 | | 12/2003 | Rhodes et al. |
| 2005/0104969 A1 | | 5/2005 | Schoelkopf et al. |

FOREIGN PATENT DOCUMENTS

WO WO 9850870 A1 * 11/1998

OTHER PUBLICATIONS

Disclosure Statement Under 37 C.F.R. § 1.56 for U.S. Appl. No. 10/629,347.
Non-Final Office Action mailed Nov. 1, 2007 for U.S. Appl. No. 11/068,268.
Final Office Action mailed Aug. 7, 2008 for U.S. Appl. No. 11/068,268.

* cited by examiner

*Primary Examiner*—Thierry L Pham
(74) *Attorney, Agent, or Firm*—Keith D. Nowak; Libby Babu Varghese; Carter Ledyard & Milburn LLP

(57) ABSTRACT

The present invention provides a measurement tool for use with an application suited for viewing a digitized drawing. The measurement tool enables the measurement of lengths (of both lines and poly lines) and areas (of both regular and irregular shapes) from a digital drawing in true scale. This is particularly advantageous with original architectural drawings or other drawings that are scanned from paper into a digital format and where measuring or annotating the drawing in true scale is important.

12 Claims, 6 Drawing Sheets

SYSTEMS AND METHODS FOR PROVIDING TRUE SCALE MEASUREMENTS FOR DIGITIZED DRAWINGS

RELATED APPLICATION DATA

The present invention claims the benefit of U.S. Provisional Patent Application Ser. No. 60/398,927, filed Jul. 27, 2002, titled "Systems and Methods for Viewing and Modifying Digitized Drawings," the contents of which are hereby incorporated by reference as if set fully herein.

BACKGROUND OF THE INVENTION

I. Field of the Invention

The present invention relates generally to digital images, and more particularly, to the viewing of digital images.

II. Description of Related Art

The scanning of paper documentation into digital images is well known. Some of the advantages of digital or electronic documents over paper documents include reduced storage space, immediate and simple copying, quick retrieval, easy sharing through electronic transfer (e.g., e-mail), persistent and non-volatile nature of a digital format, and the conservation of natural resources such as trees. While a completely digital office is not a reality for most businesses, it is rare to find a business that doesn't rely heavily on digital documents in the ordinary course of its business.

For example, property owners, land developers, architects, and document management professionals scan active and historical documents relating to properties, such as building blueprints, floor plans, and riser diagrams, to save space and enable more efficient copying and distribution of the documents. However, once a drawing is scanned, the scale information on the drawing is no longer valid when the digital version of the paper drawing is viewed on a monitor or display device. In particular, the digital image of the drawing is typically captured as an digital image having a certain pixel by pixel dimension with no direct relationship to the scale information provided on the original drawing. Thus, when the image is viewed using a monitor or display, it is virtually impossible for the viewer to obtain true measurement information from the rendered image because the scale of the paper drawing, for instance, one inch equals three feet, is not valid for the rendered image on the monitor or display.

Accordingly, some of the utility inherent in paper documents is lost when the documents are digitized. This lost utility is particularly problematic in the certain cases, such as with architectural drawings, when it is desirable to determine the measurements of a room, the length of a wall, or the square footage of a section of a floor, which is often the main reason for viewing the drawings. In addition, when annotating the digital drawing, it is often desirable to annotate to scale.

Thus, there exists a unsatisfied need in the industry for a means to view a digital drawing with the ability to determine a true dimensional characteristic of the rendered subject matter.

SUMMARY OF THE INVENTION

The present invention provides a measurement tool for use with an application suited for viewing a digitized drawing. The measurement tool enables the measurement of lengths and areas (both regular shaped and irregular shaped areas) from a digital drawing in true scale. This is particularly advantageous with digitized architectural drawings or other drawings that are scanned from paper into a digital format where measuring or annotating the drawing in true scale is important.

In an embodiment, the present invention comprises the steps of digitizing a paper document, capturing the scale data and the physical parameters of the paper being digitized (e.g., scanned), embedding the scale and physical parameter data in a header associated with the file of the digitized image, and then storing the digitized image. The present invention further provides for the processing of the header data when viewing the digitized image through a viewer application such that the header data can be used in measuring true scale line lengths and areas. For example, when the digitized paper being viewed is a floor plan, then the header data can be used to measure distances and areas on the floor plan in true scale. Once the line is drawn, the true scale measurement is calculated using the header scale data, then it can be further converted to a desired unit of measurement and then presented to the user.

The step of capturing the scale and physical parameters of the paper being digitized comprises capturing the original scale information of the paper, the DPI of the scan, and the original size of the paper. If the paper is imaged as a TIFF file, then the captured data is stored in the TIFF header using TIFF header tags.

When viewing the TIFF image, a user can use the drawing tools that are a part of the viewer to draw a line or shape. The locations of the pixels that define the line or shape are captured by the viewer for use with the header data to calculate the true scale length of the line. As mentioned above, the present invention provides for the measurement of lengths (for both lines and polylines) and areas (for both regular shapes as well as irregular shapes, such as rectangles, polygons and inverse polygons).

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
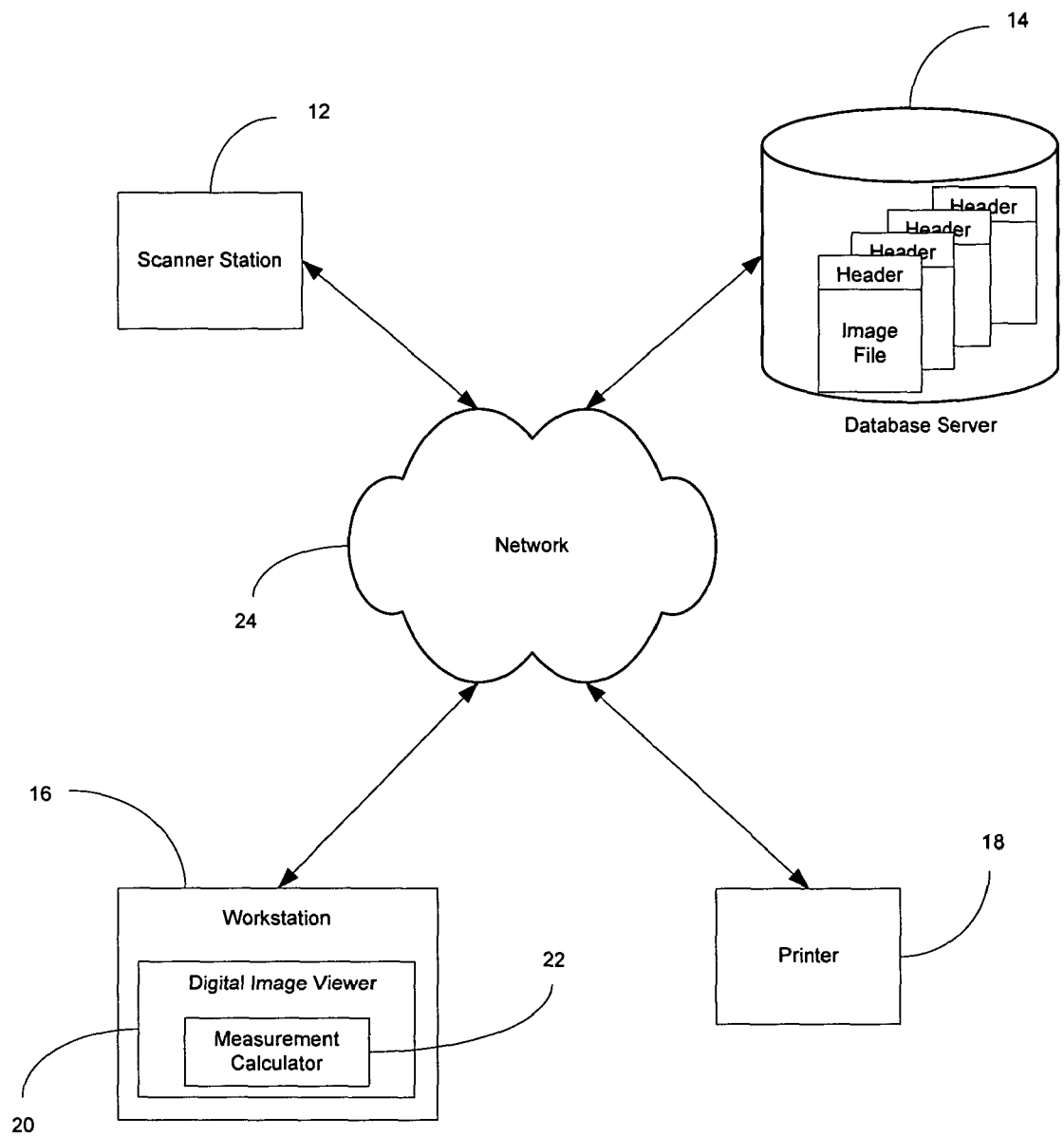
FIG. 1 is a schematic block diagram illustrating a system in accordance with an embodiment with the present invention.

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

It will be appreciated that the systems and methods of the present invention are described below with reference to block diagrams and flowchart illustrations. It should be understood that blocks of the block diagrams and flowchart illustrations, and combinations of blocks in the block diagrams and flowchart illustrations, respectively, may be implemented by computer program instructions. These computer program instructions may be loaded onto a general purpose computer, special purpose computer, or other programmable data processing apparatus to produce a mechanism, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the functions specified herein. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified herein. Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present invention provides a measurement tool for use with a viewer application for viewing a digitized drawing. The measurement tool enables the measurement of lengths and areas (both regular shaped and irregular shaped areas) in true scale. While the present invention can be used with the digital representation of a paper document having a scaled drawing, such as an architectural drawings, engineering drawings or maps, it is described below in the context of architectural drawings for illustrative purposes. The disclosed embodiment should not be considered as limiting to the breath of the invention.

With reference to FIG. 1, an embodiment of the present invention comprises a scanner station 12, a database 14, a workstation 16 and a printer 18. The scanner station 12 includes a scanner and associated software required to capture a digital image of a paper document, such as a building blueprint, floor plan, riser diagram or other architectural or design drawing. In a preferred embodiment, the scanner station 12 comprises a high speed, large format scanner that is connected to a desktop computer of sufficient speed and RAM to process large digital images. It is also preferred that the scanner utilizes either ISIS or TWAIN interfaces, and that the compression/decompression algorithm utilized is TIFF CCITT Group 4 non-LZW, which is a lossless compression algorithm. It is important that the algorithm be lossless to preserve the pixel-to-pixel bitmap data captured by the scanner. The database server 14 comprises any suitable database for storing the image file created by the scanner and its associated software.

The workstation 16 may be any suitable computing device with user interface means such as a monitor, keyboard, mouse, stylus, etc. The workstation may be a desktop computer or a portable computing device, such as laptop, PDA or cell phone. The workstation includes a viewer 20. In the illustrated embodiment, the view 20 is a TIFF viewer capable of reading (i.e., decompressing) a TIFF image and displaying it to a user. The viewer 20 can be built, for example, utilizing the viewer components and tools provided by LEAD Technologies, Inc. Specifically, LEAD Technologies, Inc. provides a decompression tool, rubber band tool, display tool, overlay display tool, overlay storage tool and tag read tool that can be assembled into a TIFF viewer. A key aspect of the viewer 30 is the inclusion of a measurement calculator 22, in accordance with the present invention, for calculating the true scale measurement of lines and shapes drawing with the viewer 20.

The printer 18 is any suitable printer capable of printing from the workstation 16, and a network 24 interconnects the aforementioned devices. The network 24 may comprise any telecommunication and/or data network, whether public or private, such as a local area network, a wide area network, an intranet, an internet and/or any combination thereof and may be wired and/or wireless. Due to network connectivity, various methodologies as described herein may be practiced in the context of distributed computing environments.

Figure 2:
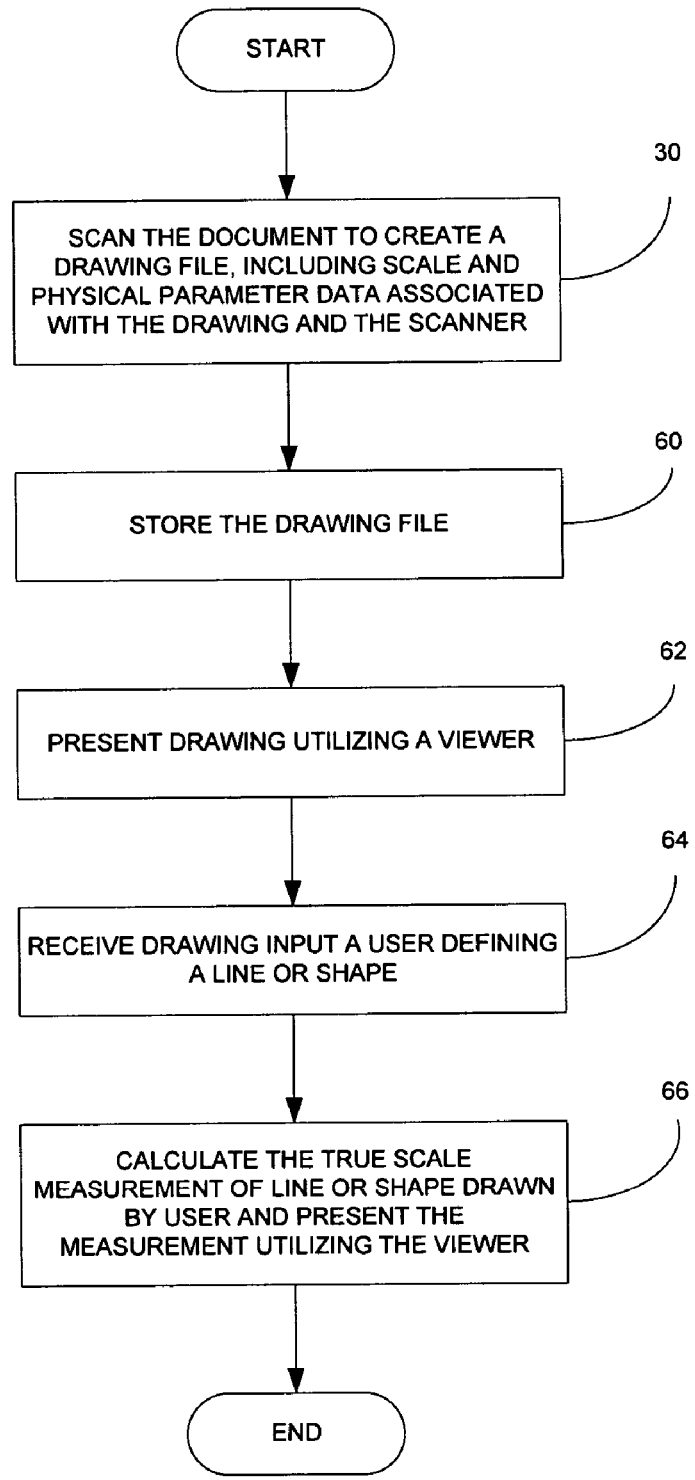
FIG. 2 is a flowchart of an embodiment of the present invention.

With reference to FIG. 2, a method in accordance with the present invention is shown. As an initial step, a paper document is digitized, as indicated by block 30. This step includes scanning the paper document using the scanner station 12 to create a bitmapped image. In the illustrated embodiment, the paper document is a drawing. The scale data and physical parameters of the paper drawing being scanned are captured and associated with the bitmapped image. Specifically, the original scale information of the paper drawing, the DPI of the scan, and the original size of the paper are recorded and associated with the digital image.

Figure 3:
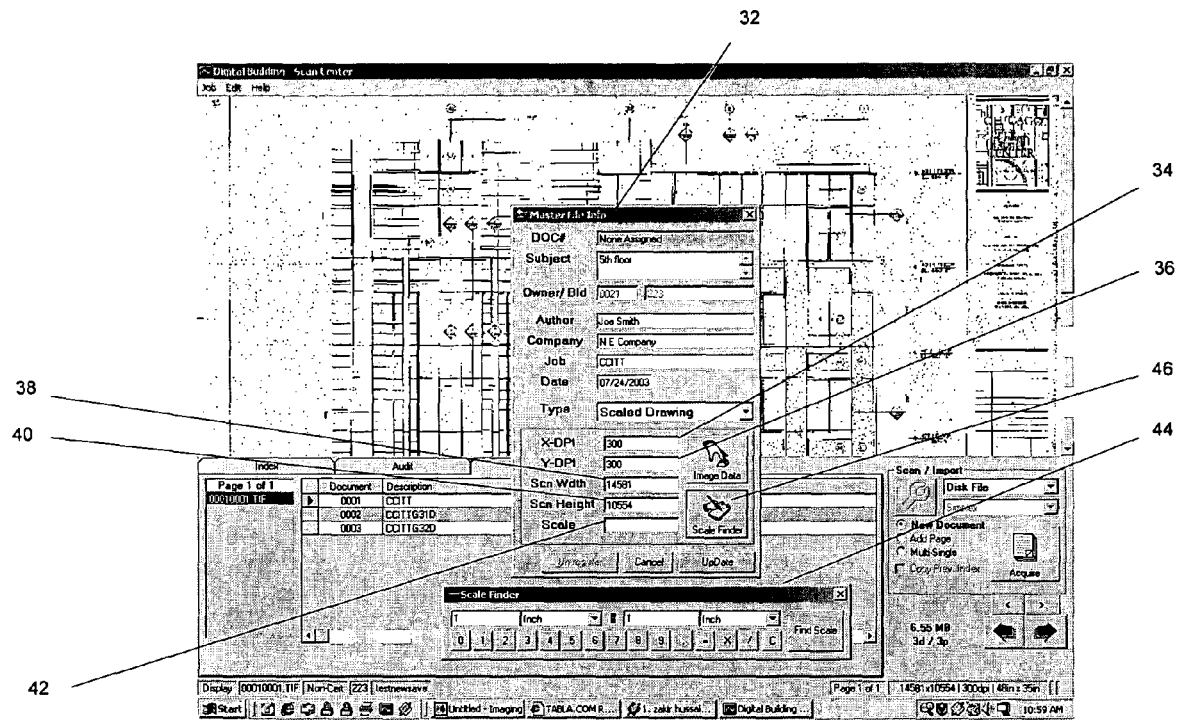
FIG. 3 is an illustrative user interface for inputting scale data associated with a scanned document, in accordance with an embodiment of the present invention.

An illustrative user interface for recording this information is provided in FIG. 3, which shows a Master File Info window 32 for entering the scale and physical parameter data of the paper drawing being scanned. Of particular interest, the X-DPI and Y-DPI fields 34,36 are where the direct optical scan characteristics of the scanner that are utilized for the scan are recorded. These values should be calibrated to ensure their accuracy. The SCN Width and SCN Height fields 38,40 are the actual pixel dimensions of the scanned image. The Scale field 42 is where the actual scale of the drawing is recorded as an integer. The value inputted may be calculated using the Scale Finder 44, which is provided at the selection of the Scale Finder button 46. The user merely enters the scale from the drawing in the correct units, and the Scale Finder will write the correct scale value into the Scale field 42. For example, if the scale was one inch equals three feet, the Scale Finder would write 36 into the Scale Field 42. Similarly, if the scale were one centimeter equals one meter, the Scale Finder would write 100 in the Scale field 42.

Figure 4:
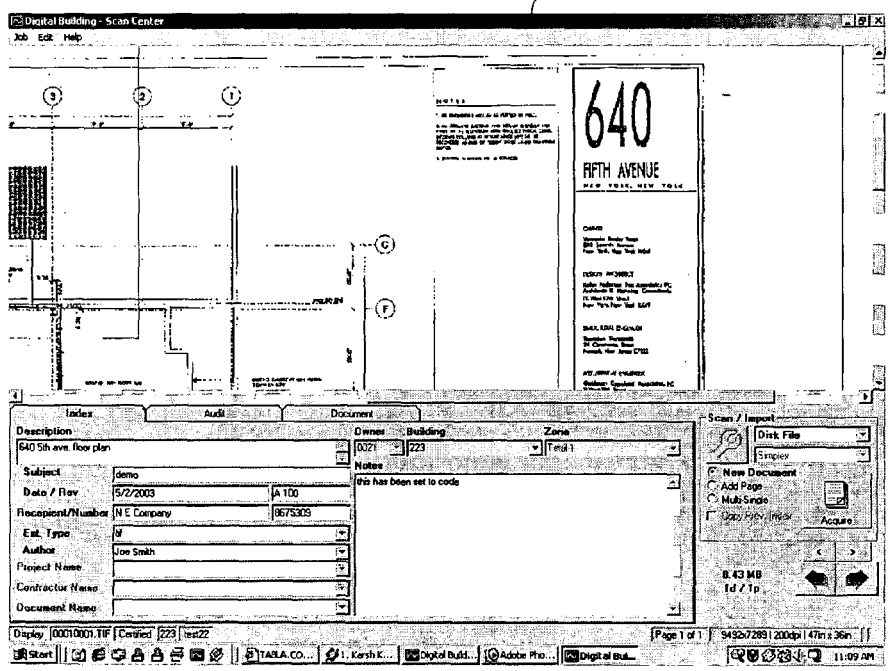
FIG. 4 is an illustrative user interface for inputting data associated with a scanned document, in accordance with an embodiment of the present invention.

It should be noted that the information recorded and associated with the digital image file does not necessarily have to be recorded at the time the image is scanned or otherwise acquired. Also, additional information identifying the paper document may also be recorded, such as the building name, building owner, date of drawing, etc., as shown in the user interface 50 of FIG. 4.

In the illustrated embodiment, the paper drawing is optically scanned and saved as a TIFF file, and the captured data is stored in the TIFF header using TIFF header tags. TIFF Tag 50271 is a suitable location for storing the scale and physical parameter data. A suitable data structure for such information may be:

Tag 50271=DBSWWWWHHHHAABBSSSSSSSDB
DBS=Digital Building Plan Tag (letters "DBP")
W=Width (Original image scan width in pixels)
H=Height (Original image scan height in pixels)
A=HDPI (Horizontal DPI of scan)
B=VDPI (Vertical DPI of scan)
S=Scale (Inches to Inches document Scale, i.e., 1"=36")
DB=Digital Building Identifier Tag ("DB")

The Adobe tag 50271 is stored as ASCII data type with a variable length of 24 characters beginning with either "DBS" and ending with the Digital Building Identification Tag "DB". The width W is the scan width of the image in pixels. The height H is the height of the image in pixels. The A and B are the horizontal and vertical direct optical DPI of the scanner, respectively. This is the direct optical resolution of the scanner. The scale S is the scale taken from the paper drawing. Alpha-numeric ASCII characters with ASCII values between #48 and #90 may be used in data fields to avoid data and compression conflicts. In the illustrated embodiment, the values are converted to a base 34 number.

Referring back to FIG. 2, once the digital image file has been created, it may be stored, as indicated by block 60, preferably within a RAID server with its accompanying entry in the database sever 14. However, the digital image file may be stored in the memory of virtually any computing device, including at the scanning station 12 or the workstation 16. It is envisioned, however, that a plurality of digital image files are stored together at a central data repository.

The digital image may then be viewed by a user, as indicated by block 62, preferably at a workstation 16. The digital image file is sent to the workstation via the network 24. The digital image viewer 20, can be utilized to open and view the digital image. The digital viewer application should at a minimum, have some drawing tools, with at least the ability to draw lines and to interconnect those lines to form a shape.

Figure 5:
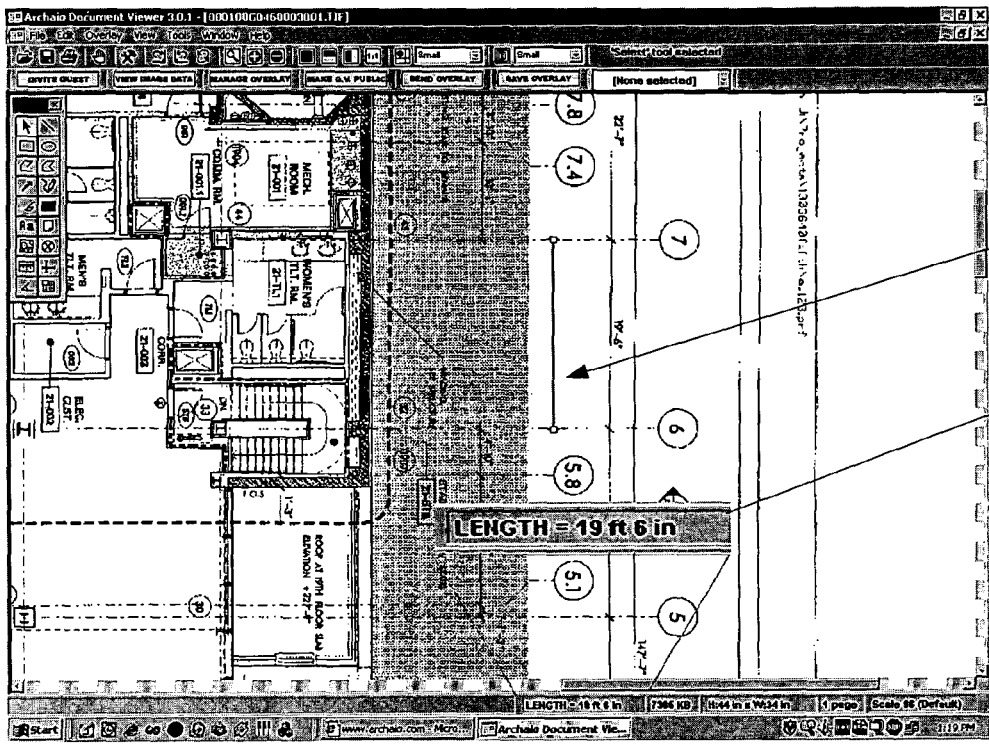
FIG. 5 is an illustrative user interface for viewing a scan document, wherein the user has drawn a line and the true scale measurement of the line is displayed to the user, in accordance with an embodiment of the present invention.
Figure 6:
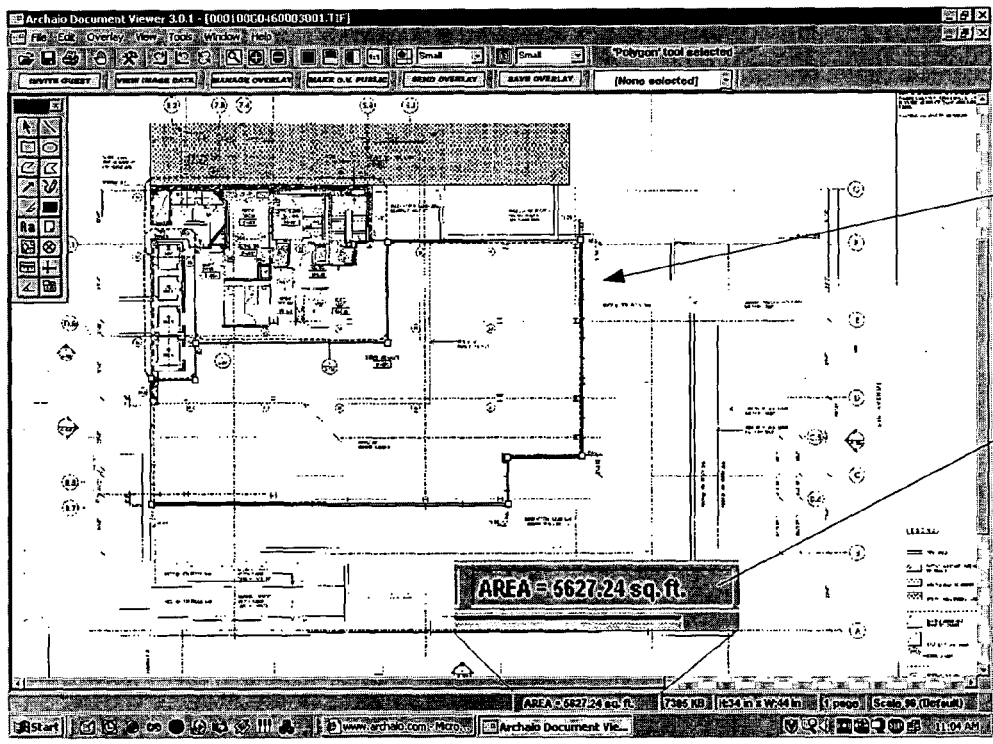
FIG. 6 is an illustrative user interface for viewing a scan document, wherein the user has drawn a polygon and the true scale measurement of the polygon is displayed to the user, in accordance with an embodiment of the present invention.

The user then utilizes the viewer to draw a line or shape (e.g., a regular shape or irregular shape, such as a polygon or an inverse polygon), as indicated by block 64. For example, as illustrated in FIG. 5, the user has drawn a line 70, such as by the clicking and dragging the mouse or dragging a stylus. The true scale measurement of that line is calculated and presented to the user in the tool bar field 72, as indicated by block 66. Another example is provided in FIG. 6, wherein the user has drawn a polygon 74 and the true scale area of the polygon is presented to the user in the tool bar filed 76. Thus, in accordance with the present invention, the digital image viewer 20 is modified to access the scale and physical parameter information associated with the digital image and calculate the true scale measurement of a line or area of a shape.

In the illustrated embodiment, the digital image viewer 20 reads the TIFF header tag 50271 to retrieve the scale and physical parameter data. The digital image viewer 20 then provided the measurement calculator 22 with the pixel data defining the user's drawing (e.g., a line or shape) and the scale information read from the tag. The measurement calculator 22 then calculates the true scale measurement using that information and the pixel location data of the line or shape. The calculated measurement can be presented to the user in any suitable format or location on the screen, though in the illustrated embodiment, the measurement is presented in a tool bar at the bottom of the window.

For illustrative purposes, several calculations are provided for lengths and areas of annotations drawn by the user using the drawing tools of the digital image viewer 20, and in particular, using a mouse input device.

Figure 7:
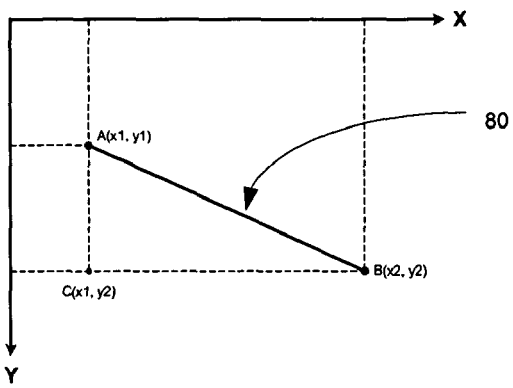
FIG. 7 is a schematic drawing illustrating the calculation of the length of a line, in accordance with an embodiment of the present invention.

The length of a line 80 is calculated with general reference to FIG. 7. The user initially triggers the calculations with a mouse-down event (while the line annotation is selected from the drawing tool bar). This event provides the first point of reference $(X_1, Y_1)$ in pixels, as illustrated in FIG. 7. When the user releases the mouse button this triggers a mouse-up event. This event provides the second (and final) point of reference $(X_2, Y_2)$ in pixels. With these two points $((X_1, Y_1)$ and $(X_2, Y_2))$ measurement calculator 22 can calculate the length between them (in pixels) using the Pythagorean Theorem, as provided by Equation (1) below:

$$\text{Length (in pixels)} = ((x_2-x_1)^2 + (y_2-y_1)^2)^{(1/2)} \quad (1)$$

This length is then divided by the resolution of the image to produce the representative length in inches on the original plan, or drawing, as provided by Equation (2) below:

$$\text{Length (in inches)} = (\text{length (in pixels)})/(\text{image resolution (dpi)}) \quad (2)$$

This length (in inches) is then multiplied by the blueprint scale (embedded into the header of the TIFF image) to produce the actual length (in inches) of the line, as provided by Equation (3) below:

$$\text{Actual length} = \text{plan length (in inches)} \times \text{plan scale} \quad (3)$$

The measurement calculator 22 then provides this true scale measurement to the viewer 20 for display to the user. If desired, further conversion can be made into the units desired, such as from inches to feet or meters by simple multiplication of the unit conversion factor.

Figure 8:
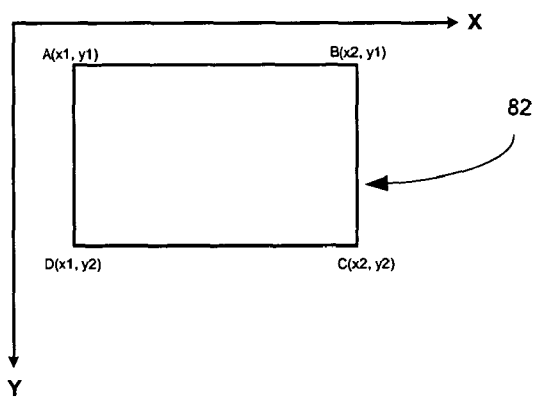
FIG. 8 is a schematic drawing illustrating the calculation of the area of a rectangle, in accordance with an embodiment of the present invention.

Next, the area of a rectangle 82 will be calculated with reference to FIG. 8. Initially, the user triggers the calculations with a mouse-down event (while the rectangle annotation is selected from the drawing tool bar). This event provides the first point of reference $(X_1, Y_1)$ in pixels. When the user releases the mouse button this triggers a mouse-up event. This event provides the second (and final) point of reference $(X_2, Y_2)$ in pixels. With these two points $((X_1, Y_1)$ and $(X_2, Y_2))$, the measurement calculator 22 can calculate the area between them (in pixels) using the Pythagorean Theorem, Equation (4) provided below:

$$\text{Area (in pixels)} = (x_2-x_1)^2 + (y_2-y_1)^2 \quad (4)$$

This area is then divided by the squared of the resolution of the image to produce the representative area in inches on the original plan, or drawing, as provided by Equation (5) below:

$$\text{Area (in inches)} = (\text{Area (in pixels)})/(\text{image resolution (dpi)})^2 \quad (5)$$

This area (in inches) is then squared and multiplied by the square-root of the blueprint scale (embedded into the header of the TIFF image) to produce the actual area (in inches) of the selected rectangle, as provided by Equation (6) below:

$$\text{Actual area} = (\text{plan area (in inches)})^2 (\text{plan scale})^{(1/2)} \quad (6)$$

The measurement calculator 22 then provides this true scale measurement to the viewer 20 for display to the user. Further conversion can be made into the units desired, such as from inches to feet or meters by simple multiplication of the unit conversion factor.

Figure 9:
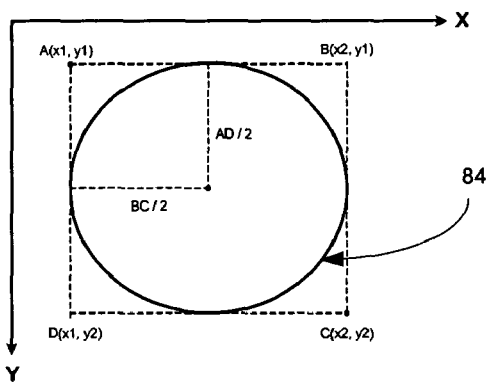
FIG. 9 is a schematic drawing illustrating the calculation of the area of an ellipse, in accordance with an embodiment of the present invention.

The area of an ellipse 84 is illustrated next with general reference to FIG. 9. The user initially triggers the calculation with a mouse-down event (while the ellipse annotation is selected from the drawing tool bar). This event provides the first point of reference $(X_1, Y_1)$ in pixels. Then the user releases the mouse button this triggers a mouse-up event. This event provides the second (and final) point of reference $(X_2, Y_2)$ in pixels. With these two points $((X_1,Y_1)$ and $(X_2,Y_2))$, the measurement calculator 22 can calculate the area between them (in pixels) using the Pythagorean Theorem, Equation (7) provided below:

$$\text{Area (in pixels)} = \pi[((x_2-x_1)/2) + ((y_2-y_1)/2)] \quad (7)$$

This area is then divided by the squared of the resolution of the image to produce the representative area in inches on the original plan, or drawing, as provided by Equation (8) below:

$$\text{Area (in inches)} = (\text{Area (in pixels)})/(\text{image resolution (dpi)})^2 \quad (8)$$

This area (in inches) is then squared and multiplied by the square-root of the blueprint scale (embedded into the header of the TIFF image) to produce the actual area (in inches) of the selected ellipse, as provided by Equation (9) below:

$$\text{Actual area} = (\text{plan area (in inches)})^2 (\text{plan scale})^{(1/2)} \quad (9)$$

The measurement calculator 22 then provides this true scale measurement to the viewer 20 for display to the user. If desired, further conversion can be made into the units desired, such as from inches to feet or meters by simple multiplication of the unit conversion factor.

Figure 10:
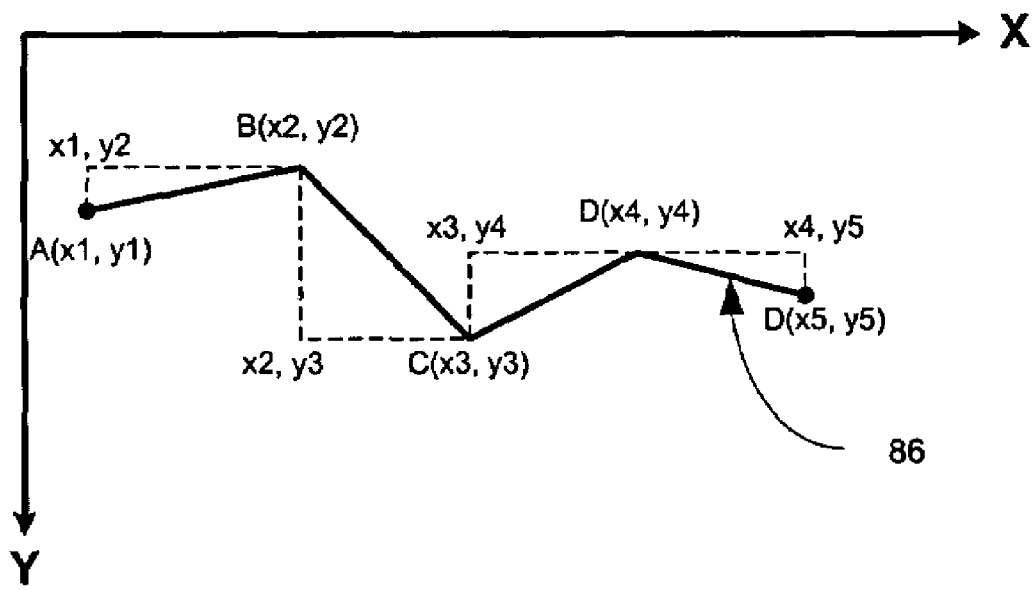
FIG. 10 is a schematic drawing illustrating the calculation of the length of a polyline, in accordance with an embodiment of the present invention.

The length of a polyline 86 is calculated next with general reference to FIG. 10. The user initially triggers this calculation with a mouse-down event (while the polyline annotation is selected from the drawing tool bar). This event provides the first point of reference $(X_1,Y_1)$ in pixels. The user then moves the mouse and clicks (the left-button) to add additional nodes $[(X_2, Y_2). (X_3, Y_3), \ldots (X_{n+1}, Y_{n+1})]$. Once the user is completed with the polyline they can either double-click the left mouse button or single click the right mouse button to end the polyline and trigger the calculation of the length. This provides, for use in the calculation of the length, (n+1) nodes and (n) line segments; where 'n' is some arbitrary absolute number. With this collection of points the measurement calculator 22 can cycle through each node and calculate the summation of the lengths of each line segment using the Pythagorean Theorem (on each segment respectively), as provided below by Equation (10):

$$\text{Length (in pixels)} = \sum_{i=1}^{n} ((x_{i+1}-x_i)^2 + (y_{i+1}-y_i)^2)^{(1/2)} \quad (10)$$

This length is then divided by the resolution of the image to produce the representative length in inches on the original plan, or drawing, as provided by Equation (11) below:

$$\text{Length (in inches)} = (\text{length (in pixels)})/(\text{image resolution (dpi)}) \quad (11)$$

This length (in inches) is then multiplied by the blueprint scale (embedded into the header of the TIFF image) to produce the actual length (in inches) of the polyline, as provided by Equation (12) below:

$$\text{Actual length} = \text{plan length (in inches)} \times \text{plan scale} \quad (12)$$

The measurement calculator 22 then provides this true scale measurement to the viewer 20 for display to the user. If desired, further conversion can be made into the units desired, such as from inches to feet or meters by simple multiplication of the unit conversion factor.

Figure 11:
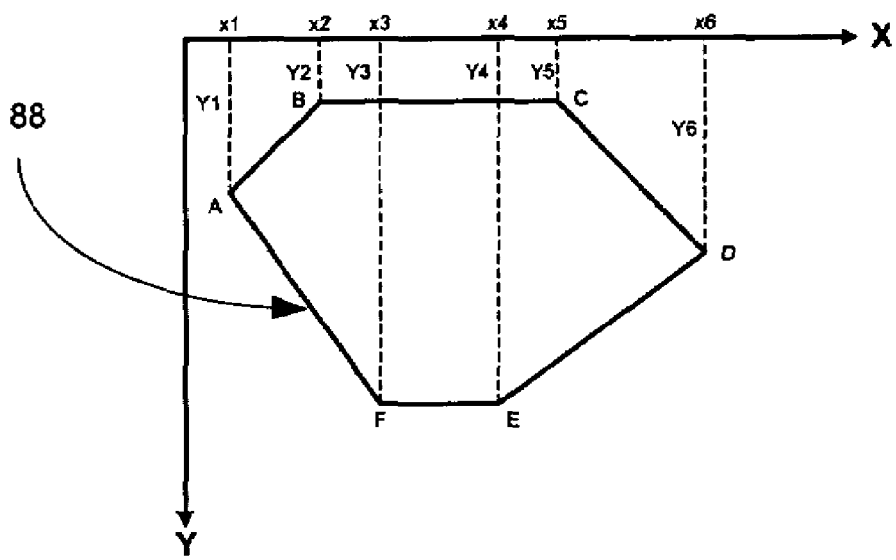
FIG. 11 is a schematic drawing illustrating the calculation of the area of a polygon, in accordance with an embodiment of the present invention.

The area of a polygon 88 is next illustrated with reference to FIG. 11. The user initially triggers these calculations with a mouse-down event (while the polygon annotation is selected from the drawing tool bar). This event gives us the first point of reference $(X_1, Y_1)$ in pixels. The end user then moves the mouse and clicks (e.g., the left-button) to add additional nodes $[(X_2, Y_2). (X_3, Y_3), \ldots (X_{n+1}, Y_{n+1})]$. Once the user is completed with the polygon they can either double-click the left mouse button or single click the right mouse button to end the polygon and trigger the calculation of the length. This provides, for use in the calculation of the length, with (n+1) nodes and (n) line segments; 'n' is arbitrary and absolute. With this collection of points one can iterate through the line segments and get a running total for the area. This area is calculated by first identifying a baseline below the polygon, then identifying a trapezoid whose sides consist of (1) a single line segment on the polygon, (2) a line from the rightmost point in the polygon segment to the baseline which is perpendicular to the baseline, (3) a segment of the baseline, and (4) a line from the baseline to the leftmost point in the line segment (drawn perpendicular to the baseline). The area of the trapezoid is calculated with Equation (13) below:

$$\text{Area (in pixels)} = (1/2) \sum_{i=1}^{n} (x_i y_{i+1} - x_{i+1} y_i) \quad (13)$$

This area is then divided by the squared of the resolution of the image to produce the representative area in inches on the original plan, or drawing, as provided by Equation (14) below:

$$\text{Area (in inches)} = (\text{Area (in pixels)})/(\text{image resolution (dpi)})^2 \quad (14)$$

This area (in inches) is then squared and multiplied by the square-root of the blueprint scale (embedded into the header of the TIFF image) to produce the actual area (in inches) of the selected rectangle, as provided by Equation (15) below:

$$\text{Actual area} = (\text{plan area (in inches)})^2 (\text{plan scale})^{(1/2)} \quad (15)$$

The measurement calculator 22 then provides this true scale measurement to the viewer 20 for display to the user. If desired, further conversion can be made into the units desired, such as from inches to feet or meters by simple multiplication of the unit conversion factor.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for providing actual scale information of a digital raster image, comprising:
    digitizing a paper document using a digitizing device to create a digital raster image;
    recording scale information associated with the paper document and scale information of digitizing device, wherein the scale information includes an original scale of the paper document, a dots per inch (DPI) of the digitizing device, and an original size of the paper drawing;
    embedding the scale information in a tag location of a header of the digital raster image;
    storing the digital raster image as a single file, wherein said embedded scale information is embedded in said tag location of said header of said single file; and
    providing a digital image viewer for,
        rendering the digital raster image,
        receiving drawing input from a user comprising a line or a shape,
        calculating a true scale measurement of the drawn line or shape based at least in part on the embedded scale information in said tag location of said header of said single file, and
        presenting the true scale measurement to the user via the viewer.

2. The method of claim 1, wherein the digital raster image is a TIFF image.

3. The method of claim 2, wherein embedding the scale information in a tag location of a header of the digital raster image comprises embedding the scale information in a tag location of a header of the TIFF image.

4. A computer-based method for providing true scale information of a digital raster image made from a paper document by a digitizing device, comprising:
    receiving a digital raster image, wherein the digital raster image has scale information of the paper document and the scale information of the digitizing device embedded in a tag location of a header of the digital raster image, wherein the scale information includes an original scale of the paper document, a dots per inch (DPI) of the digitizing device, and an original size of the paper drawing;
    rendering the digital raster image;
    receiving drawing input from a user comprising a line or shape;
    calculating a true scale measurement of the drawn line or shape based at least in part on the scale information embedded in said tag location of said header of the digital raster image; and
    presenting the true scale measurement to the user.

5. The method of claim 4, wherein the digital raster image is a TIFF image.

6. The method of claim 5, wherein the scale information is embedded in a tag location header of the TIFF image.

7. A system for presenting actual scale information of a digital raster image, comprising:
    a digitizing device that digitizes a paper document to create a digital raster image,
    wherein scale information associated with the paper document and the scale information of the digitizing device is recorded and embedded in a tag location of a header of the digital raster image, wherein the scale information includes an original scale of the paper document, a dots per inch (DPI) of the digitizing device, and an original size of the paper drawing; and
    a digital image viewer that receives the digital raster image and:
        renders the digital raster image,
        receives drawing input from a user comprising a line or shape,
        calculates a true scale measurement of the drawn line or shape based at least in part on the scale information embedded in said tag location of said header of the digital raster image; and
        presents the true scale measurement to the user.

8. The system of claim 7, further comprising:
    at least one memory operable to store the digital raster image and the embedded scale information as a single file.

9. The system of claim 7, wherein the digital raster image is a TIFF image.

10. The system of claim 9, wherein the scale information is embedded in a tag location of a header of the TIFF image.

11. The method of claim 1, wherein the received drawing input is a shape, and
    wherein calculating a true scale measurement of the drawn shape comprises calculating the area of the drawn shape.

12. The method of claim 1, wherein receiving drawing input comprises receiving drawing input in the rendered single digital raster image.

* * * * *